Feb. 3, 1931.            H. T. SEELEY            1,791,327
                    AUTOMATIC SWITCHING EQUIPMENT
                         Filed Nov. 13, 1929
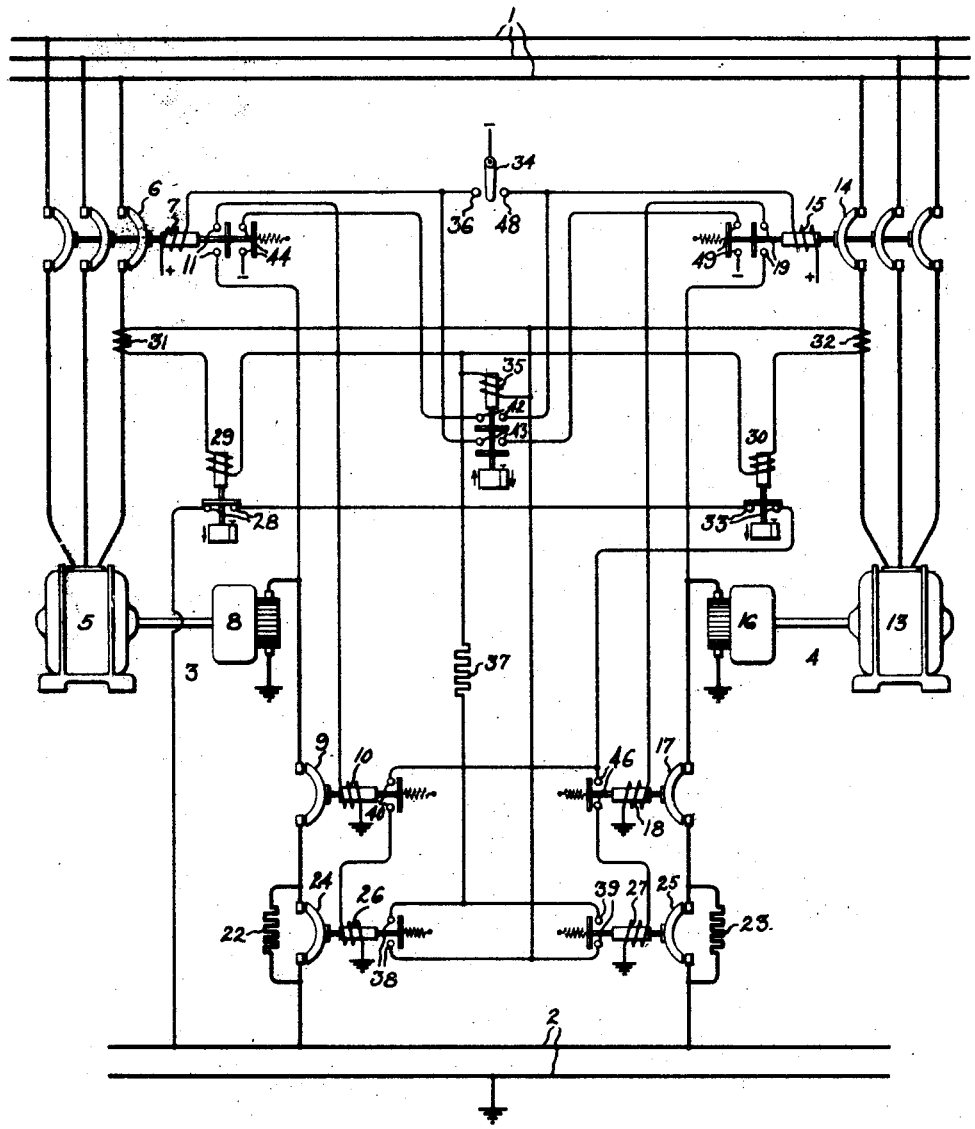
                                        Inventor:
                                    Harold T. Seeley,
                                  by Charles E. Tullar
                                      His Attorney.

Patented Feb. 3, 1931

1,791,327

UNITED STATES PATENT OFFICE

HAROLD T. SEELEY, OF YEADON, PENNSYLVANIA, ASSIGNOR TO GENERAL ELECTRIC COMPANY, A CORPORATION OF NEW YORK

AUTOMATIC SWITCHING EQUIPMENT

Application filed November 13, 1929. Serial No. 406,956.

My invention relates to automatic switching equipments for multiple unit automatic stations and particularly to equipments which are arranged to place additional units in operation when the load on a station exceeds predetermined values.

In certain types of switching equipments for units in an automatic station, means are provided which decrease the output of a unit under predetermined abnormal load conditions. When the units of a multiple unit automatic station are provided with such switching equipments and also with timing means for effecting the operation of an additional unit in response to the output of the units in operation there is a possibility that under certain abnormal load conditions the output reducing means of the units in service may so reduce the station output before the timing means can effect the operation of the additional units that the additional units are not placed in operation when they should be and one object of my invention is to provide an improved arrangement for insuring that the additional units are placed in service under such abnormal load conditions.

My invention will be better understood from the following description when taken in connection with the accompanying drawing which diagrammatically illustrates an automatic switching equipment for a two-unit automatic substation embodying my invention, and its scope will be pointed out in the appended claims.

Referring to the drawing, 1 represents an alternating current supply circuit, 2 a direct current load circuit, and 3 and 4 suitable A. C. to D. C. translating devices, shown as motor generator sets, for transferring electrical energy from the supply circuit 1 to the load circuit 2. Each translating device has associated therewith suitable automatic switching means, examples of which are well known in the art, for effecting the interconnection of the translating device between the two circuits 1 and 2. In order to simplify the drawing only a very simplified switching equipment, which is deemed necessary for clear understanding of my invention, is diagrammatically shown for each translating device. As shown, the motor 5 of the motor generator set 3 is arranged to be connected to the supply circuit 1 by a suitable switch 6 when the closing coil 7 thereof is energized, and the generator 8 of the motor generator set 3 is arranged to be connected across the load circuit 2 by a suitable switch 9 when the closing coil 10 thereof is energized. The circuit of the closing coil 10 is arranged to be connected across the terminals of the generator 8 by auxiliary contacts 11 on the switch 6 so that the switch 9 is closed only when the switch 6 is closed and the voltage of the generator 8 is above a predetermined value.

Similarly, the motor 13 of the motor generator set 4 is arranged to be connected across the supply circuit 1 by a suitable switch 14 when the closing coil 15 thereof is energized and the generator 16 of the motor generator set 4 is arranged to be connected across the load circuit 2 by means of a suitable switch 17 when the closing coil 18 thereof, which is connected across the terminals of the generator 16 by the auxiliary contacts 19 on the switch 14, is energized.

In order to limit the current supplied by each motor generator set to the load circuit 2 under abnormal load conditions, each motor generator set is provided with suitable means, examples of which are well known in the art, for limiting the output of the set under such abnormal load conditions. In the arrangement shown in the drawing, this result is accomplished by providing suitable current limiting means, such as the resistors 22 and 23, respectively in series with the generators 8 and 16, and normally having these resistors respectively short-circuited by suitable switches 24 and 25 which are arranged to be opened when the load on either motor generator set exceeds a predetermined value. As shown, the switches 24 and 25 are respectively provided with closing coils 26 and 27, which, as long as they are energized, maintain the respective switches closed. In order to effect the opening of the switches 24 and 25 in response to a predetermined overload on either motor generator set, the circuits of the closing coils 26 and 27 are controlled by suitable overload relays 29 and 30 which are respectively connected so that they are energized in response to the loads on the motor generator sets 3 and 4. In the particular arrangement shown in the drawing, the winding of the overload relay 29 is connected in series with the secondary winding of a current transformer 31, the primary winding of which is connected in series with the armature winding of the motor 5 of the motor generator set 3, and the winding of the overload relay 30 is connected in series with the secondary winding of a current transformer 32, the primary winding of which is connected in series with the armature winding of the motor 13 of the motor generator set 4. Since the ratio between the current supplied to the motor of a motor generator set and the current supplied by the generator to the load is substantially constant, it will be observed that the overload relays 29 and 30 are respectively energized in accordance with the outputs of the motor generator sets 3 and 4.

In multiple unit automatic stations it is the usual practice to place one machine in operation and then start the second machine when the load on the station exceeds a predetermined value. In order to equalize the wear on the machines, it is also the practice to provide an arrangement whereby the sequence in which the units are placed in operation can be changed. In the arrangement shown in the drawing the sequence in which the motor generator sets are placed in operation is determined by means of a selector switch 34 which, when placed in one position, effects the operation of the automatic switching means of the motor generator set 3 so that it is interconnected between the circuits 1 and 2 and which, when placed in another position effects the operation of the automatic switching means of the motor generator set 4 so that it is interconnected between the circuits 1 and 2. In order to place the other set in operation when either set is in operation and the load on the station is above a predetermined value, I provide in accordance with my invention a time delay starting relay 35 the winding of which is connected across the secondary windings of the current transformers 31 and 32 so that the relay 35 is energized in accordance with the total load on the station. When either motor generator set is in operation and the total load on the station exceeds a predetermined value for a predetermined time, the relay 35 closes its contacts and effects the operation of the automatic switching equipment associated with the other motor generator set so as to effect its interconnection between the supply circuit 1 and the load circuit 2.

In order to insure that the overload starting relay 35 is sufficiently energized to close its contacts and effect the starting of the second unit after an abnormal load on the load circuit 2 has caused the load limiting arrangement associated with the motor generator set in operation to function, I provide, in accordance with my invention, a suitable impedance, such as a resistor 37, in shunt to the winding of the relay 35 so that normally the relay winding receives only a portion of the sum of the secondary currents of the transformers 31 and 32, and also provide means for removing the impedance 37 from the circuit of the winding 35 when the load limiting arrangement of the overloaded motor generator set is in operation. As shown in the drawing, this result is accomplished by providing in the circuit of the resistor 37 the parallel connected auxiliary contacts 38 and 39 of the switches 24 and 25 respectively so that the shunt circuit through the resistor 37 is opened when both of the switches 24 and 25 are open. Therefore, when the switches 24 and 25 are open, the relay 35 is energized by the sum of the secondary currents of the transformers 31 and 32 instead of only a portion of the total secondary current. The impedances of the resistor 37 and the winding of the starting relay 35 are so proportioned that the relay 35 continues to operate after the load limiting resistor 35 is connected in series between the motor generator set which is in operation and the load circuit. Preferably the relation between the impedances is such that a given abnormal load causes substantially the same amount of current to flow through the relay winding before the current limiting resistor is connected in circuit with the overloaded motor generator set as flows after the current limiting resistor is connected in circuit.

The operation of the arrangement shown in the drawing is as follows: Let it be assumed that both units are shut down and that it is desired to effect the starting of the motor generator 3 as the leading unit. Switch 34 is then moved to its left position so that it closes its contacts 36 and completes an energizing circuit for the closing coil 7 of the switch 6. The energization of the closing coil 7 effects the closing of the switch 6 so that the motor 5 of the motor generator set 3 is connected across the supply circuit 1. As soon as the speed of the motor generator set 3 builds up to a value sufficient to cause the voltage of the generator 8 to build up to a predetermined value, the closing coil 10, which is connected across the terminals of the generator 8 by means of the auxiliary contacts 11 on the switch 6, closes the switch 9 so that the generator 8 and the load limiting resistor 22 are connected in series across the load circuit 2. If the load connected across the load circuit 2 at this time is normal, the closing coil 26 of the switch 24 is energized to close the switch 24 and thereby short-circuit the load limiting resistor 22. The energizing circuit of the closing coil 26 is from one side of the load circuit 2 through the contacts 28 of the overload relay 29, contacts 33 of the overload relay 30, auxiliary contacts 40 on the switch 9, closing coil 26 to the other side of the load circuit 2.

When the total load on the station exceeds a predetermined value the overload starting relay 35, which is energized in response to the current supplied to the motor 5 starts to close its contacts 42 and 43 and if the total load on the station remains above a predetermined value for a predetermined time the relay 35 closes these contacts. The closing of the contacts 42 of the relay 35 completes through the auxiliary contacts 44 on the switch 6 an energizing circuit for the closing coil 15 of the switch 14 so that the motor 13 of the motor generator set 4 is connected across the supply circuit 1. As soon as the speed of the motor generator set 4 builds up to a value sufficient to cause the voltage of the generator 16 to build up to a predetermined value, the closing coil 18, which is connected across the terminals of the generator 16 by the auxiliary contacts 19 on the switch 14, closes the switch 17 so that the generator 16 and the load limiting resistor 23 are connected in series across the load circuit 2. If the load conditions are normal at this time, the closing coil 27 is immediately energized to close the switch 25 and short-circuit the load limiting resistor 23. The energizing circuit of the closing coil 27 is from one side of the load circuit through the contacts 28 of the overload relay 29, contacts 33 of the overload relay 30, auxiliary contacts 46 on the switch 17, closing coil 27 to the other side of the load circuit 2.

When it is desired to have the motor generator set 4 operate as the leading unit, the switch 34 is moved to its right-hand position in which position it closes its contacts 48. The closing of the contacts 48 completes an energizing circuit for the closing coil 15 of the switch 14 so that the motor 13 of the motor generator set 4 is connected across the supply circuit 1 and the generator 16 is subsequently connected across the load circuit 2 in the manner above described. When the motor generator set 4, while operating as a leading unit, becomes overloaded the overload starting relay 35 operates to close its contacts 42 and 43 after a predetermined time interval. The closing of the contacts 43 of the relay 35 completes an energizing circuit for the closing coil 7 of the switch 6 through the auxiliary contacts 49 on the switch 14. The energization of the closing coil 7 closes the switch 6 so that the motor 5 is connected across the supply circuit 1 and the generator 8 is subsequently connected across the load circuit 2 in the manner above described.

Heretofore, in the description of the operation, it has been assumed that the load connected to the load circuit 2 at the time the second unit is started is not sufficient to operate the overload relay associated with the unit which is in operation. Let it be assumed now that while the motor generator set 3 is in operation a heavy overload suddenly occurs on the load circuit 2 so that the overload relay 29 associated with the motor generator set 3 opens its contacts 28 before the time delay starting relay 35 can close its contacts 42 and 43. The opening of the contacts 28 of the overload relay 29 interrupts the heretofore described circuit for the closing coil 26 of the switch 24 so that the switch 24 opens and inserts the load limiting resistor 22 in series between the generator 8 and the load circuit 2. The switch 24 by opening its auxiliary contacts 38 also removes the resistor 37 from in shunt to the winding of the relay 35 so that as long as the resistor 22 is connected in circuit to limit the output of the generator 8 the winding of the relay 35 is energized by the sum of the secondary currents of the transformers 31 and 32 instead of only a portion of the sum as under normal conditions. Consequently the relay 35 remains sufficiently energized and completes its timing operation and the closure of its contacts 42 and 43.

Similarly, when only the motor generator set 4 is in operation and a severe overload occurs, the overload relay 30 opens its contacts 33 and effects the deenergization of the closing coil 27 of the switch 25 so that the short-circuit is removed from around the load limiting resistor 23. The opening of the auxiliary contacts 39 of the switch 25 disconnects the resistor 37 from in shunt to the winding of the relay 35 so that the winding is energized in response to the sum of the secondary currents of the transformers 31 and 32.

Therefore, it will be observed that when either motor generator set is in operation and its associated current limiting resistor is connected in series therewith, the setting of the time delay starting relay 35 is changed so that the current flowing through its winding is a greater per cent of the current output of the station than when the resistors are not connected in circuit.

While I have, in accordance with the patent statutes, shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States is:—

1. In combination, a source of current, a load circuit supplied by said source, means responsive to predetermined abnormal load conditions on said circuit for decreasing the amount of current supplied to the load circuit by said source, a winding normally energized in accordance with the current supplied by said source to said circuit, and means controlled by said current decreasing means for varying the circuit connections of said winding so that a given abnormal load connected to said load circuit causes substantially the same value of current to flow through said winding after the current decreasing means has decreased the amount of current supplied to said load circuit as flowed before said current was decreased.

2. In combination, a source of current, a load circuit supplied by said source, means responsive to predetermined abnormal load conditions on said circuit for decreasing the amount of current supplied to the load circuit by said source, a winding normally energized in accordance with the current supplied by said source to said circuit, an impedance connected in a shunt circuit around said winding, and means controlled by said current decreasing means for opening said shunt circuit when said current decreasing means operates to decrease the current supplied to said load circuit by said source.

3. In combination, a source of current, a load circuit supplied by said source, current limiting means, means responsive to predetermined abnormal load conditions on said circuit for connecting said current limiting means between said source and circuit, a winding normally energized in accordance with the current output of said source, and means controlled by said connecting means for varying the circuit connections of said winding when said current limiting means is connected between said load circuit and source whereby a given abnormal load causes substantially the same value of current to flow through said winding when said current limiting means is connected between said source and load circuit as when it is not so connected in circuit.

4. In combination, a source of current, a load circuit supplied by said source, means responsive to predetermined abnormal load conditions on said circuit for decreasing the current output of said source to said circuit, a winding, a circuit for said winding connected so that the current flowing through the winding is a predetermined per cent of the current output of said source, and means controlled by said output decreasing means for controlling the circuit connections of said winding so that the current flowing through it is a different per cent of the current output of said source when the current output is decreased by said output decreasing means.

5. In combination, a source of current, a load circuit supplied by said source, current limiting means, means responsive to predetermined abnormal load conditions on said circuit for effecting the connection of said current limiting means between said source and load circuit so as to decrease the output of said source, a winding, a circuit for said winding connected so that the current in said last mentioned circuit is proportional to the current output of said source, an impedance connected in shunt to said winding in said circuit for said winding, and means controlled by said connecting means for removing said impedance from in shunt to said winding when said current limiting means is limiting the output of said source.

6. In combination, an alternating current supply circuit, a direct current load circuit, an A. C. to D. C. translating device connected between said circuits, means responsive to predetermined abnormal load conditions on said load circuit for limiting the current output of said translating device to said load circuit, an electroresponsive device having a winding connected in series relation with said supply circuit and translating device so that the current in said winding is proportional to the current flowing from said supply circuit to said translating device, and means controlled by said output limiting means for changing the ratio between the current in said winding and the current supplied from said supply circuit to said device when the output is being limited.

7. In combination, an alternating current supply circuit, a direct current load circuit, and A. C. to D. C. translating device connected between said circuits, current limiting means connected in series between said device and load circuit, a switch for short-circuiting said current limiting means, means responsive to predetermined abnormal load conditions on said load circuit for opening said switch, a time relay having a winding connected in series relation with said supply circuit and translating device, an impedance connected in shunt to said winding, and means controlled by said switch for removing said impedance from in shunt to said winding when said switch is open.

8. In combination, an alternating current supply circuit, a direct current load circuit, an A. C. to D. C. translating device connected between said circuits, current limiting means connected in series between said device and load circuit, a switch for short-circuiting said current limiting means, means responsive to predetermined abnormal load conditions on said load circuit for opening said switch, a current transformer having its primary winding connected in series circuit with said supply circuit and translating device, a time relay having a winding connected to the secondary circuit of said transformer, an impedance connected in shunt to said winding in the secondary circuit of said transformer, and means controlled by said switch for removing said impedance from in shunt to said winding when said switch is open.

9. In combination, an alternating current supply circuit, a direct current load circuit, an A. C. to D. C. translating device, automatic switching means for interconnecting said device between said circuits, a second A. C. to D. C. translating device, automatic switching means for interconnecting said second device between said circuits, means for effecting the operation of each switching means to effect the interconnection of the associated device between said circuits, and means for effecting the operation of the switching means associated with the other translating device when either of said translating devices is interconnected between said circuits and is overloaded including two current transformers having their respective primary windings connected in series relation with said translating devices and a relay having a winding connected to the secondary windings of said transformers so that it is energized in response to the sum of the currents supplied to said devices by said supply circuit.

10. In combination, an alternating current supply circuit, a direct current load circuit, an A. C. to D. C. translating device, automatic switching means for interconnecting said device between said circuits, a second A. C. to D. C. translating device, automatic switching means for interconnecting said device between said circuits, a second A. C. to D. C. translating device, automatic switching means for interconnecting said second device between said circuits, means for effecting the operation of one of said switching means to effect the interconnection of the translating device controlled thereby between said circuits, and means for effecting the operation of the other switching means in response to a predetermined overload on the interconnected translating device including two current transformers having their respective primary windings connected in series relation with the A. C. sides of said translating devices and a relay having a winding connected to the secondary windings of said transformers so that it is energized in accordance with the sum of the currents supplied to said devices by said supply circuit.

11. In combination, an alternating current supply circuit, a direct current load circuit, an A. C. to D. C. translating device, automatic switching means for interconnecting said device between said circuits, a second A. C. to D. C. translating device, automatic switching means for interconnecting said second device between said circuits, means for effecting the operation of each switching means to effect the interconnection of the associated device between said circuits, and means for effecting the operation of the switching means associated with the other translating device when either of said translating devices is interconnected between said circuits and is overloaded including two current transformers having their respective primary windings connected in series relation with said translating devices, a relay having a winding connected to the secondary windings of said transformers so that it is energized in response to the sum of the currents supplied to said devices by said supply circuit, an impedance connected in shunt to said winding, means associated with each translating device and responsive to the load thereon for decreasing the output thereof when it exceeds a predetermined value, and means controlled by said output decreasing means for removing said impedance from in shunt to said winding when said output decreasing means is in operation.

In witness whereof, I have hereunto set my hand this 9th day of November, 1929.

HAROLD T. SEELEY.